(12) United States Patent
Garza

(10) Patent No.: US 9,004,851 B1
(45) Date of Patent: Apr. 14, 2015

(54) EFFICIENT SPIRAL WIND-TURBINE CONFIGURATION

(71) Applicant: Gustavo Q. Garza, Molalla, OR (US)

(72) Inventor: Gustavo Q. Garza, Molalla, OR (US)

(*) Notice: Subject to any disclaimer, the term of this patent is extended or adjusted under 35 U.S.C. 154(b) by 0 days.

(21) Appl. No.: 14/198,265

(22) Filed: Mar. 5, 2014

(51) Int. Cl.
*F03D 3/00* (2006.01)
*F03D 3/06* (2006.01)

(52) U.S. Cl.
CPC .............. *F03D 3/061* (2013.01); *Y10S 415/907* (2013.01)

(58) Field of Classification Search
CPC ......... F03D 3/005; F03D 3/061; F03D 3/064; F05B 2240/211; F05B 2240/243; F05B 2240/244; F05B 2250/15; F05B 2250/232; F05B 2250/25
USPC ................ 415/4.2, 4.4, 71, 72, 907; 416/176; 290/44, 55
See application file for complete search history.

(56) References Cited

U.S. PATENT DOCUMENTS

| | | | |
|---|---|---|---|
| 1,191,950 A * | 7/1916 | Custer | 416/176 |
| 4,218,175 A * | 8/1980 | Carpenter | 415/219.1 |
| 7,040,859 B2 * | 5/2006 | Kane | 415/4.2 |
| 7,997,870 B2 * | 8/2011 | Neumann | 416/132 A |
| 8,137,052 B1 * | 3/2012 | Schlegel | 415/4.3 |
| 8,378,518 B2 * | 2/2013 | Khavari et al. | 290/55 |
| 8,648,483 B2 * | 2/2014 | Haar | 290/44 |
| 2009/0295293 A1 * | 12/2009 | Lawton et al. | 315/76 |
| 2010/0143118 A1 * | 6/2010 | Eggleston et al. | 416/1 |
| 2011/0142678 A1 * | 6/2011 | Santiago et al. | 416/241 R |
| 2013/0106193 A1 * | 5/2013 | Bryson | 307/73 |

* cited by examiner

*Primary Examiner* — Edward Look
*Assistant Examiner* — Jason Davis
(74) *Attorney, Agent, or Firm* — Mersenne Law LLP

(57) ABSTRACT

A system for converting wind energy to rotational mechanical energy, comprising a conical impeller having multiple spiral vanes on its outer surface, the impeller supported so that it can rotate about its vertical, central axis in response to airflow impinging on the impeller, and connected to a mechanical drive system to transmit energy from the rotation of the impeller to a device that performs useful work using the transmitted energy.

16 Claims, 7 Drawing Sheets

EFFICIENT SPIRAL WIND-TURBINE CONFIGURATION

CONTINUITY AND CLAIM OF PRIORITY

This is an original U.S. patent application.

FIELD

The invention relates to the production of electric power by conversion of wind energy to mechanical and then to electrical energy by using a wind motor. More specifically, the invention relates to an efficient structure and arrangement of components for a prime-mover dynamo plant including a wind motor.

BACKGROUND

Wind energy has been harnessed to drive useful systems for many centuries. From sailing vessels to grain-milling machines, wind has served as a useful link between (ultimately) solar energy and tasks that people wish to accomplish.

In recent decades, wind has attracted attention as a clean, virtually inexhaustible resource that can supply part of civilization's electrical power requirements. Vast "wind farms" are a common sight where favorable climactic conditions intersect with low land prices and proximity to electrical distribution interchange locations. Many countries have made significant investments in increasing wind-power generation capacity, and the amount of wind-generated power is likely to continue to increase, even if the overall ratio of wind- to other sources of power does not change significantly.

Systems and configurations that are able to convert the available energy in wind to useful forms more efficiently, and/or that have other operational benefits over the present generation of tall, complex and difficult-to-maintain windmills deployed today will be of significant value in this field.

SUMMARY

Embodiments of the invention comprise a vertically-oriented, roughly-conical impeller ("cone") with at least one spiral vane positioned on an outer surface thereof. The conical impeller is free to rotate about its central axis, and such rotation is connected to a generator which may be stationed directly below the impeller so that power-robbing mechanical gearboxes may be simplified or eliminated. The impeller with its at least one spiral vane captures energy from the wind and typically drives a generator to produce electrical power.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
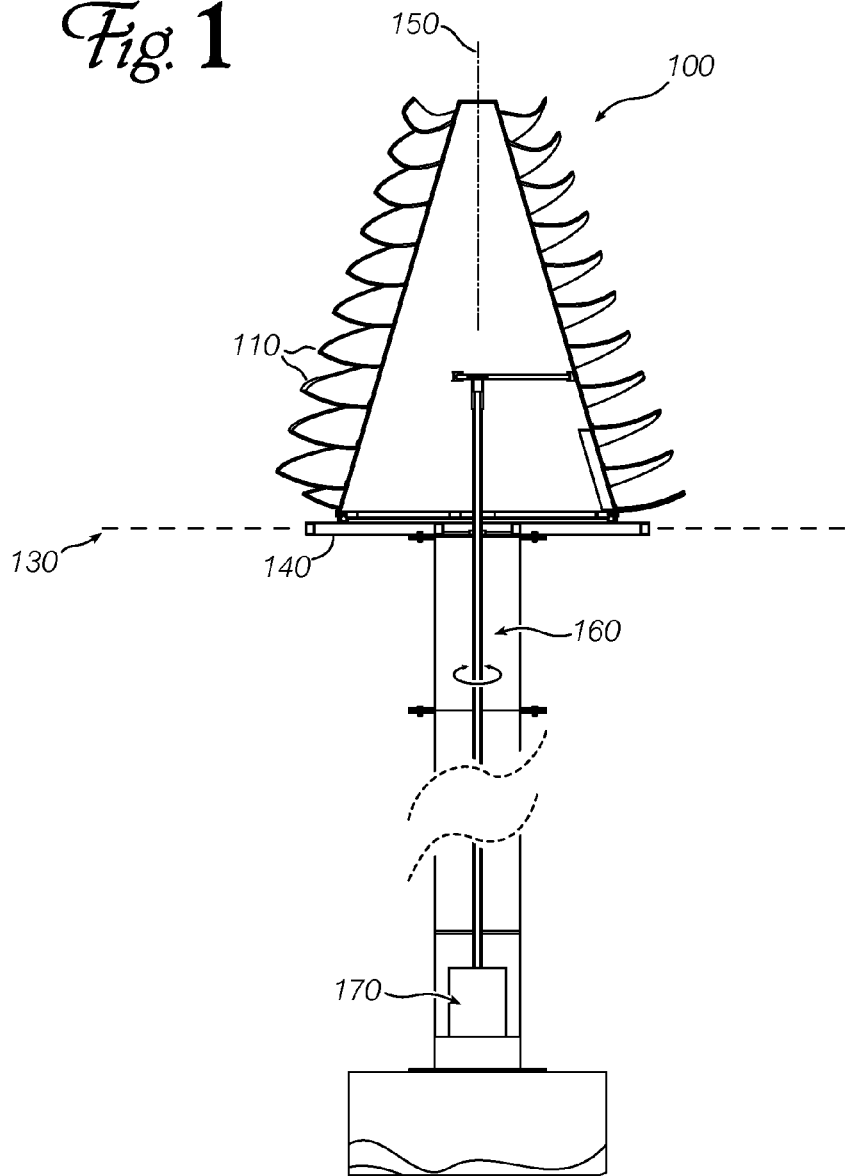
FIG. 1 shows an overview of a system comprising an embodiment of the invention.

FIG. 1 shows an example wind-driven power generation system according to an embodiment of the invention. The embodiment's most distinctive visual feature is conical impeller 100 with spiral vanes 110 on its outer surface. The impeller is stationed above a base or foundation 130, and is supported by a bearing system 140 (such as a ball-bearing system or a magnetic levitation system) that permits the impeller to rotate about its vertical centerline 150. The impeller is exposed to airflow and functions to convert energy in the airflow to mechanical rotation, which is transmitted by a drive shaft 160 (or similar structure(s)) to a generator 170. It is appreciated that a system using an embodiment of the invention may apply the mechanical rotation energy captured from the wind to accomplish a task directly (for example, the rotation may be used to compress a gas or to pump liquid into a higher reservoir, thus storing the energy for later recovery and use).

The conical impeller is similar in function to the propellers, airfoils, blades and/or turbines of prior-art wind-driven generators, but is of a new and useful form that offers a number of advantages over existing systems.

Figure 2:
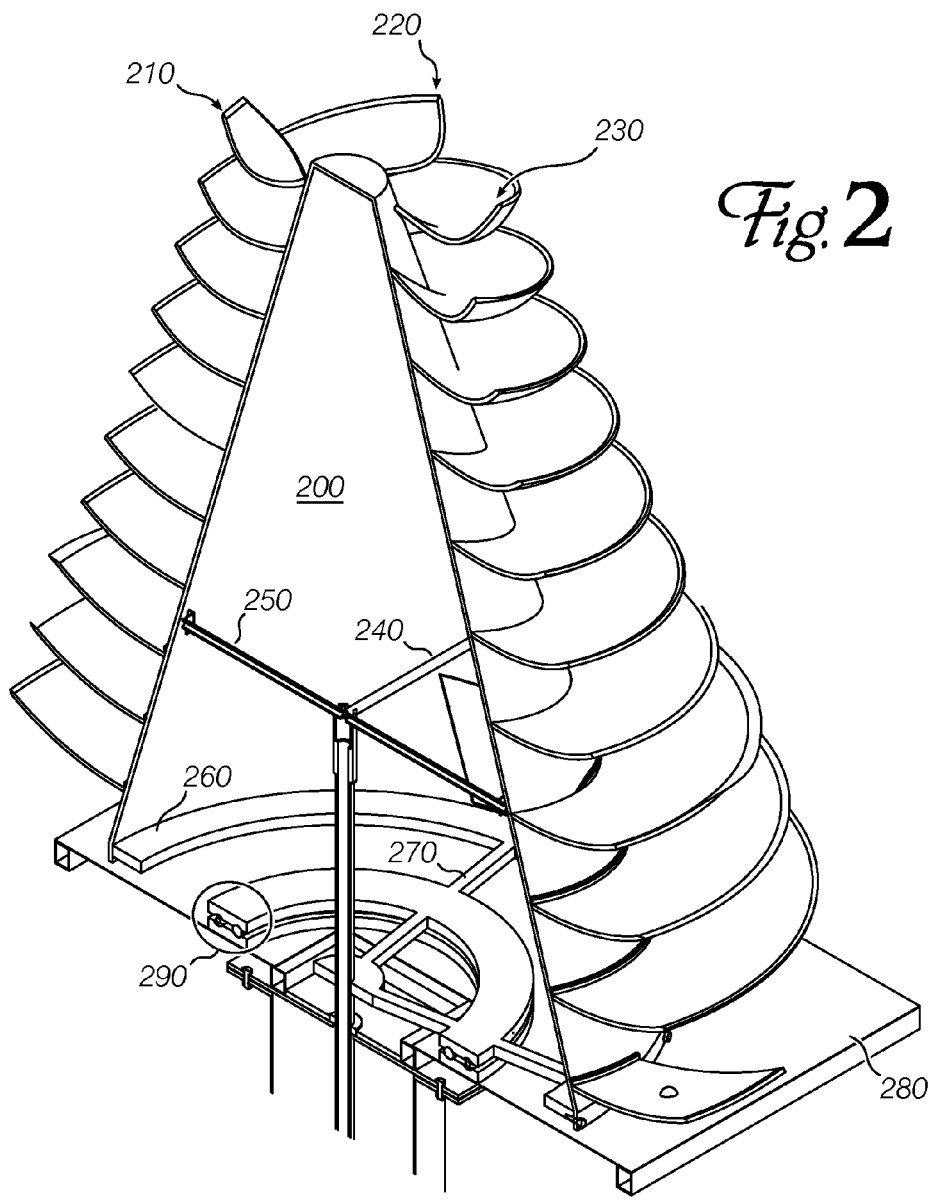
FIG. 2 is a cutaway view of an impeller according to an embodiment.

FIG. 2 is a cutaway, perspective view of an impeller 200 according to an embodiment of the invention. This view shows several separate but interleaved vanes on the outer surface of the impeller cone. Reference characters 210, 220 and 230 identify the uppermost ends of three such vanes; this embodiment actually has five vanes, but the upper ends of the other two have been removed by the cutaway. The impeller may have suitable conventional internal structure such as support struts 240 and 250, plus a reinforced inertia ring 260 with spokes 270. The base of the conical impeller 200 is supported on the system foundation 280 by a rotary bearing apparatus 290, described below.

The cone body and/or vanes may be constructed of carbon fiber. This is a light, strong material that, in combination with a heavier inertia ring, helps keep the impeller stable and prevents it from flying off in high winds.

Figure 4:
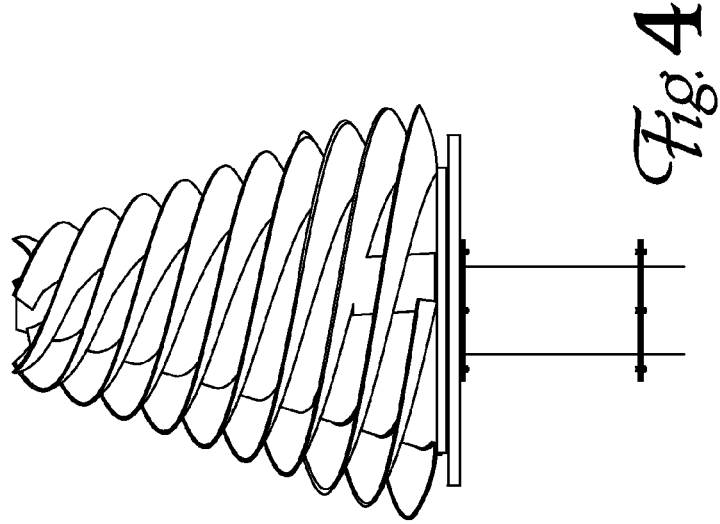
FIG. 4 is a side view of the impeller arrangement of FIG. 3.
Figure 3:
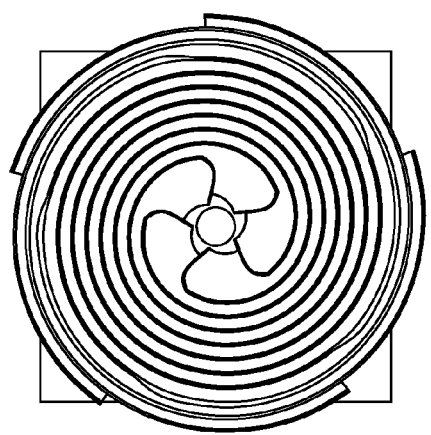
FIG. 3 is a top view of a possible impeller arrangement.

FIGS. 3 and 4 show top and side views, respectively, of an impeller according to an embodiment of the invention. Front and rear views are almost identical to the side view of FIG. 4, since the impeller is rotationally symmetric. This embodiment has five (5) separate, interleaved spiral vanes traveling up the surface of the conical impeller, so it has five-fold rotational symmetry (each 72° rotation of the impeller about the cone's central axis presents an essentially identical side view). By following the vane-edges carefully in the top view (FIG. 3), one can see that in this embodiment, each vane makes approximately two full circuits around the cone as it ascends the cone surface. In alternate embodiments, numbers of vanes between two (2) and seven (7) may be used. The profile, shape and pitch of each vane is similar to the others, and all parameters (number of vanes, profile, shape and pitch) may be adjusted to suit the overall impeller size, typical wind conditions, power generation requirements, and other factors affecting an embodiment of the invention.

These figures show vanes circling the conical impeller in a clockwise direction (from base to top, looking down from above). Embodiments may also have vanes wrapped in a counter-clockwise direction. In one system, pairs of conical impellers with opposite wrapping directions are stationed near each other, and may be mechanically coupled to the same generator (with one impeller connected via an idler gear), or the impellers may drive separate generators, but their rotational speeds may be controlled to be similar by a common control loop that monitors and controls both units. (A suitable control system is discussed below.)

Figure 5:
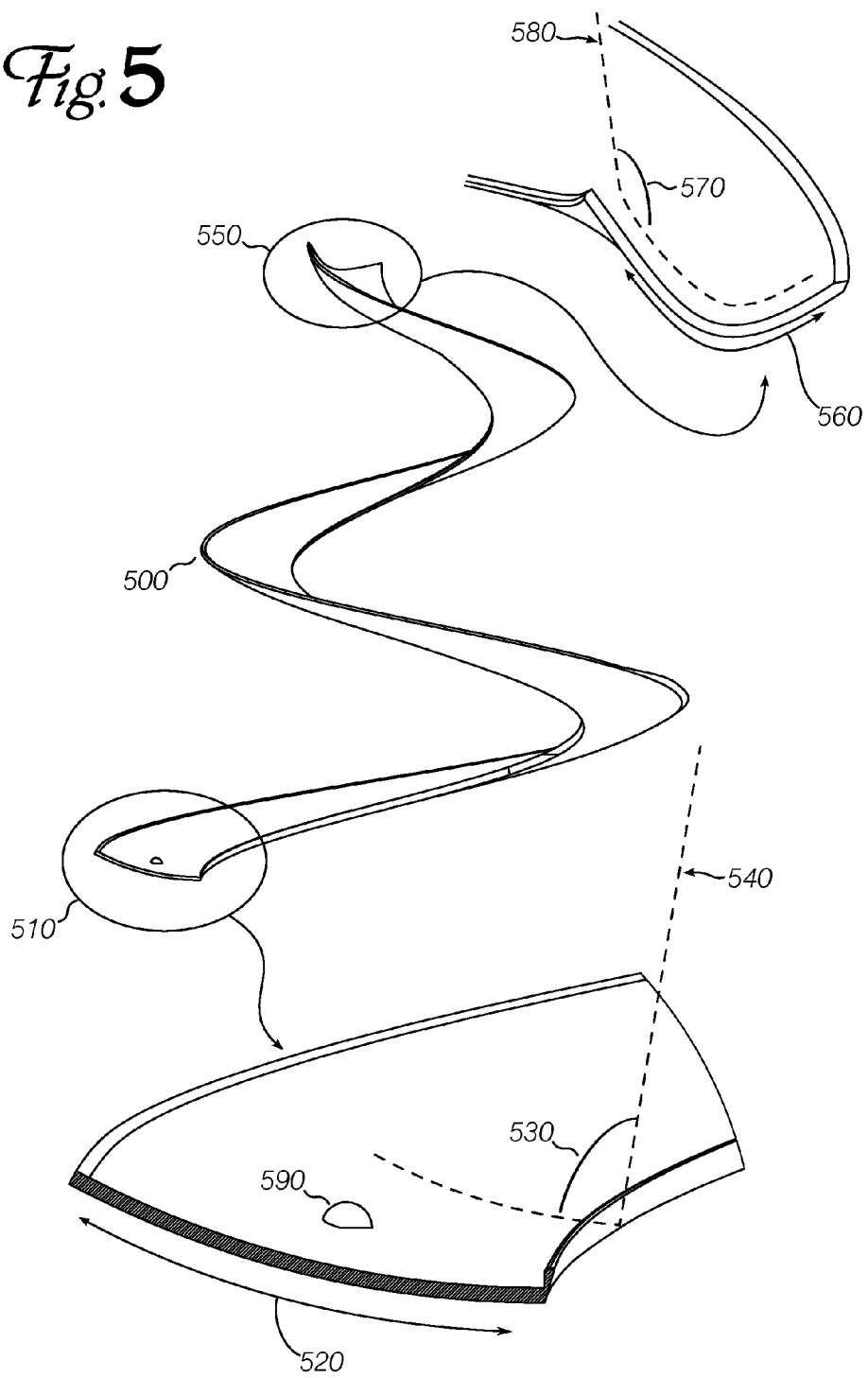
FIG. 5 shows an "unwrapped" vane, with cross sections to indicate how the vane profile may change over its length.

FIG. 5 shows one vane of an embodiment 500 "unwrapped" from its cone, with cross sections at intervals to illustrate how the vane may change along its length. For example, at the lower end 510 (at the base of the conical impeller), the vane is only modestly curved 520, and extends almost perpendicularly 530 from the surface of the cone 540. As the vane spirals up the cone, the curvature becomes more pronounced, and the vane departs from the surface of the cone at an angle exceeding 90° (measured between the vane and the cone surface above the vane). Finally, at the uppermost end 550, there is a fairly sharp bend 560 in the vane, and the cone-vane angle 570 is significantly more than 90° from the vertical extension of the cone surface 580. This Figure shows that a wind sensor 590 may be located on one or more vane lower-ends to measure wind speed, temperature, humidity, or other parameters of interest. Some embodiments may include multiple sensors at locations distributed along the length of a spiral vane to detect airflow differences at different heights on the cone. This information can be used in a generator control loop to keep the impeller rotational velocity in its most efficient range (e.g., in light winds, the generator excitation is reduced to lighten the load on the impeller, which permits the impeller to turn faster. In heavy winds, the generator excitation may be increased to prevent the impeller from exceeding safe speeds and to extract more power from the stronger winds. In extremely strong winds, it may be necessary to brake and then lock the impeller to prevent damage.)

Wind power generation impellers according to embodiments of the invention are usually installed in locations that are exposed to the elements. Thus, it is important that their surfaces be able to withstand precipitation, windborne dust and debris, sunlight, and other common influences. Although aerodynamic efficiency might be improved by a micro-scale surface treatment (for example, either a smooth, polytetrafluoroethylene ("PTFE") surface[1]; or a surface featuring small pores or other structures), superior overall performance (i.e., considering the cost of maintenance and cleaning) may be obtained by using a larger scale surface treatment. It is appreciated that a PTFE surface will help prevent snow and ice from sticking to the vanes, and will also help expedite the removal of raindrops that fall on the vanes. PTFE is also believed to be effective to increase the velocity of the wind and to create a venturi effect that improves the design efficiency.

[1] The best-known brand name for PTFE is DuPont's TEFLON®.

Figure 6:
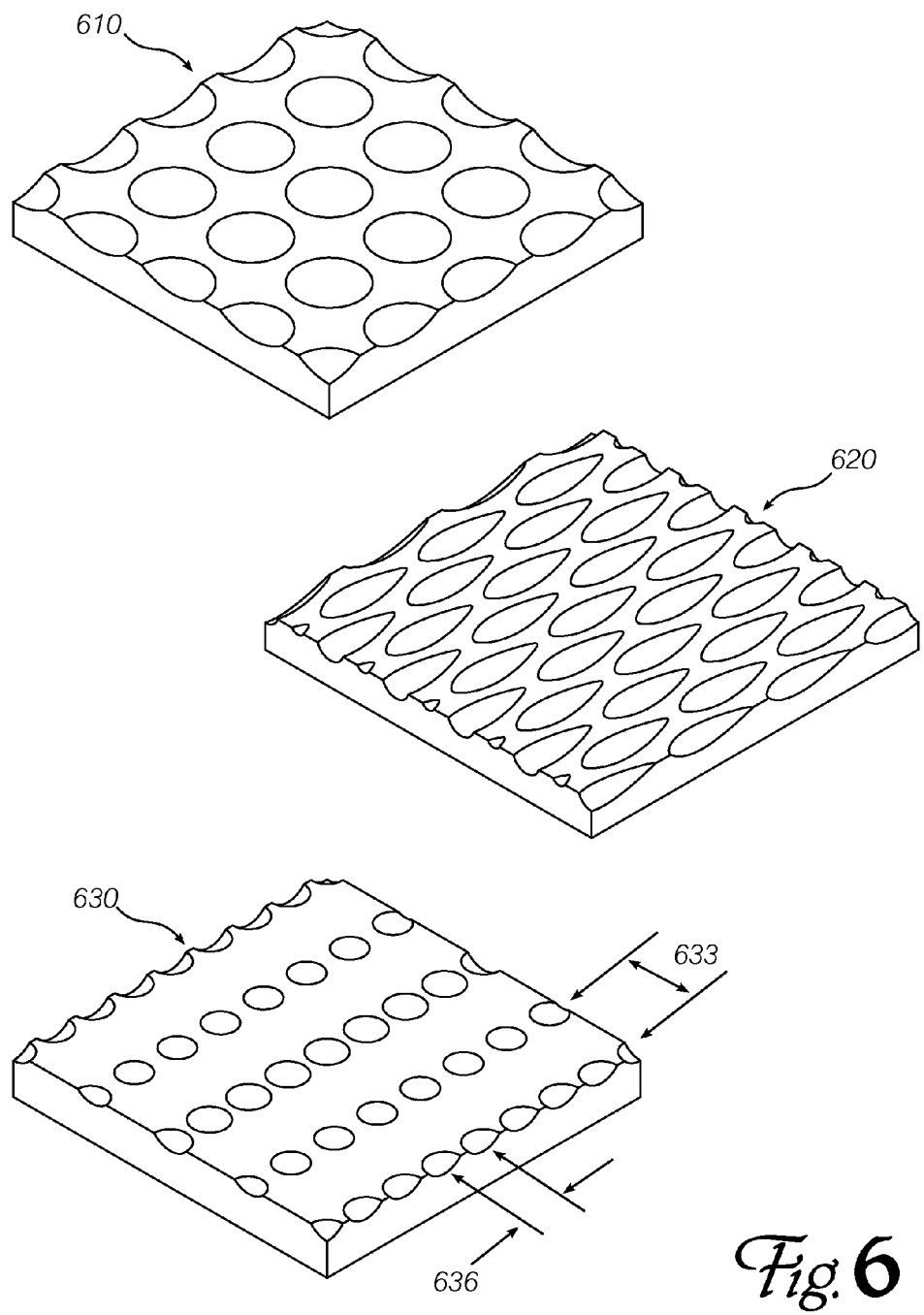
FIG. 6 shows several surface-treatment details.

FIG. 6 shows three alternative treatments that may be suitable for certain situations. In detail 610, a dimpled surface is shown: small, circular depressions with a diameter of about 3 mm and a depth of about 1 mm are formed on outer surfaces of the cone and vanes. Detail 620 shows a different surface: asymmetrical (teardrop-shaped) depressions of similar size may be formed instead of round dimples. Surface features may be placed at different horizontal and vertical displacements (detail 630, distances 633 and 636). Some embodiments may use bumps instead of depressions, or a combination of bumps and dimples. The dimple pattern of sample 610 is currently preferred and will be used on the upper surfaces of the spiral vanes to further increase the velocity of the wind by creating a venturi effect, thus enhancing the efficiency of the design.

The embodiments depicted heretofore are "middle of the road" examples, expected to be generally appropriate for many situations. However, various parameters may be altered to satisfy particular design constraints without departing from the principles of the invention. For example, the cones in the previous figures subtend an angle of about 30°, but angles between about 15° and about 60° may be better in certain applications. Cone sides may be concave or convex rather than straight, to meet aerodynamic efficiency, manufacturability or strength requirements.

The upper extremity of the cone may be truncated, since the area available at the cone point to support the upper ends of the vanes shrinks rapidly. In the foregoing Figures, the upper 15% of the cone is truncated, so that the radius of the base circle is about 6.6 times the radius of the top circle. The upper ends of the vanes may extend by about another cone-top-radius beyond the cone surface. And, as mentioned earlier, the size, shape, profile, number and twist of the vanes may be altered to achieve particular goals.

The overall size of an embodiment's impeller may also be adjusted over a wide range. An experimental embodiment only 2-3 m in height may yield useful data without requiring substantial foundation or support work, while a full-scale, full-power implementation may be 120 feet (36.6 m) tall and approximately 44 feet (13.4 m) in diameter, with vanes extending 0.5-2 m from the cone surface. Such an impeller might weigh 81,000 lbs (36,741 kg) and require substantial support at its base so that it can rotate relatively freely (thus transmitting most of the wind's energy into the drive system and the generator, rather than wasting energy overcoming frictional losses). Two principal sizes and power-ranges are expected to be the most useful: a "micro-power" impeller about 12 feet (3.66 m) tall will produce 5-100 kW of power under various wind velocities, while a full-sized impeller that is 120 feet (36.6 m) tall will produce 1.5-2.5 MW under similar conditions.

Figure 7:
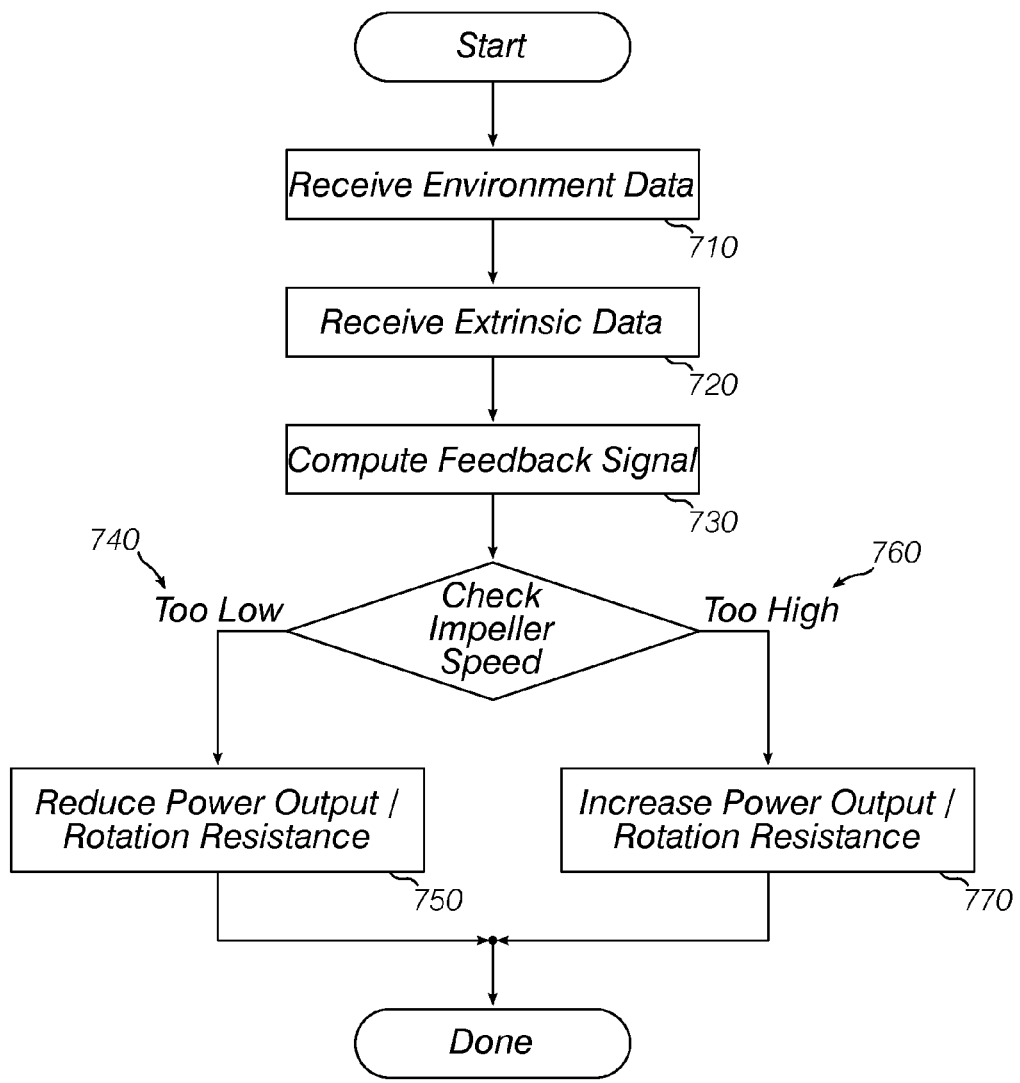
FIG. 7 is a flow chart outlining a control protocol that can be used with an embodiment of the invention.

FIG. 7 is a flow chart outlining the operations of a control system associated with an embodiment of the invention. The control system receives data inputs such as wind speed and temperature from sensors on the spiral vanes; impeller rotation speed (e.g., in revolutions per minute) (710); and extrinsic data such as time of day, electric demand, and so on (720). A feedback signal is computed based on the input data (730), where the feedback signal is proportional to a target impeller rotation speed. (The feedback signal may be denominated as an electrical power output target or similar value, but it should be convertible to an impeller rotation speed.) If the present impeller rotation speed is too low (740), a control signal is modulated to reduce the system's resistance to rotation (750). For example, the control signal could reduce the excitation of generator coils to lower the amount of energy being extracted from the wind; this will reduce the force opposing the impeller's rotation and allow the impeller to rotate faster (for a given wind speed). If the present impeller rotation speed is too high (760), the control signal can be modulated in the opposite direction, to increase the system's resistance to rotation. For example, the generator coils' excitation may be increased to extract more energy from the wind. By continuously monitoring system operation and adjusting the control signal, the impeller rotation speed can be maintained within an acceptable range. (When the wind is too weak or too strong, the impeller may be locked to prevent all rotation.)

Figure 8:
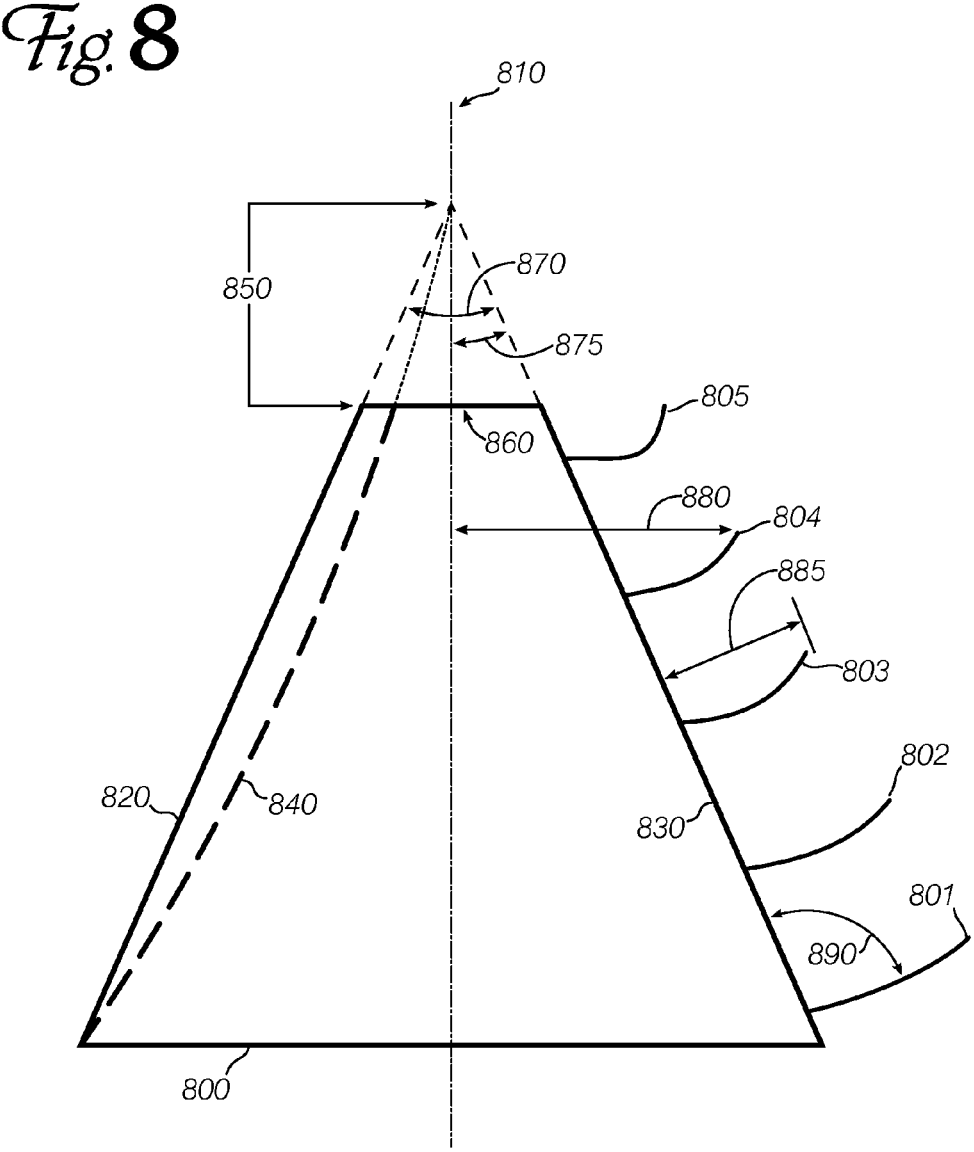
FIG. 8 is a representative drawing of a cross-section of an embodiment that indicates the locations and senses of certain measurements.

FIG. 8 shows a cross section of a representative impeller according to an embodiment of the invention. In this Figure, a number of angles and lengths are indicated to assist in understanding dimensional and relational phrases in the specification and claims. The main body of the impeller 800 is a roughly conical shape whose top portion 850 may be truncated (thus, the cross sectional view is a trapezoid). The body sides may be straight (820, 830) or curved (840). If the top is truncated, the upper end of the cone is flat (860) rather than pointed. (This top surface may have a slight convex dome formed in it to aid in shedding water.) The cone may be characterized by its interior angle (measured as 870 or 875), its base radius or diameter, and its height (specified either with or without the truncated top measurement).

The spiral vanes (801-805) extend outward from the outer surface and may be characterized by their radius (measured from the centerline 810 of the cone, as shown at 880; or measured from the surface of the cone, 885) and angle from the surface of the cone 890, as well as by their thickness (profile), contour and number of spirals about the cone surface (twist).

It is appreciated that a generator according to an embodiment of the invention places the moving parts that might require maintenance near (or even below) the ground, so that upkeep is safer and less expensive. Furthermore, an embodiment may simply disable or lock the impeller bearing to prevent overspin and damage due to excessive winds. This is in marked contrast to elevated wind generators, which may have complex blade-feathering mechanisms, rotational capability to align with the prevailing wind, and pylons built to withstand expected winds, and which have maintenance-requiring subsystems located at a significant altitude, complicating maintenance procedures.

The applications of the present invention have been described largely by reference to specific examples and in terms of particular arrangements of components and subsystems. However, those of skill in the art will recognize that efficient wind impellers utilizing the techniques of an embodiment can also be constructed in forms that are not exactly as described above or depicted in the accompanying figures. Such variations are understood to be captured according to the following claims.

I claim:

1. A system for generating electrical power from wind, comprising:
a roughly-conical impeller oriented vertically with a wider base portion below a narrower tip portion, said impeller comprising at least two spiral vanes disposed on its outer surface and supported so that the impeller is free to turn about a roughly vertical axis;
electrical generation means to convert rotary motion into electrical energy; and
mechanical transmission means to transmit rotary motion from the impeller to the electrical generation means, wherein
each spiral vane makes between two (2) and five (5) circuits around the impeller as it travels from the wider base portion of the conical impeller to the narrower tip portion of the conical impeller.

2. The system of claim 1 wherein the roughly-conical impeller and the at least one spiral vane are constructed of carbon fiber.

3. The system of claim 1 wherein the roughly-conical impeller comprises an internal spoked inertia ring at the wider base portion of the impeller.

4. The system of claim 1 wherein an interior angle of the roughly-conical impeller is approximately 30°.

5. The system of claim 1 wherein the at least one spiral vane is five (5) interleaved spiral vanes.

6. The system of claim 1 wherein each spiral vane wraps the impeller in a clockwise direction as the spiral vane ascends from the wider base portion of the conical impeller to the narrower tip portion of the conical impeller.

7. The system of claim 1 wherein each spiral vane wraps the impeller in a counter-clockwise direction as the spiral vane ascends from the wider base portion of the conical impeller to the narrower tip portion of the conical impeller.

8. The system of claim 1 wherein the roughly-conical impeller is truncated at approximately 85% of a height of a full cone having similar base diameter and interior angle.

9. The system of claim 8 wherein each of the spiral vanes extends beyond an outer surface of the roughly-conical impeller at an upper extremity of the impeller by a distance roughly equal to a radius of the impeller at the upper extremity.

10. An impeller for a wind-generation system comprising:
a truncated conical body having an interior angle of approximately 30°, a height of the truncated portion being equal to approximately 15% of a height of a similarly-sized and -shaped cone;
a central vertical axis around which the truncated conical body can rotate; and
five (5) vanes extending outward from an outer surface of the truncated conical body and spiraling up the outer surface from a wider base portion of the truncated conical body to a narrower top portion of the truncated conical body, each vane making approximately two circuits from base to top.

11. The impeller of claim 10, further comprising five (5) wind sensors, one of the wind sensors disposed on each of the five vanes.

12. The impeller of claim 10 wherein an upper surface of each of the five vanes has a PTFE surface treatment to increase a wind velocity and enhance a venturi effect.

13. The impeller of claim 10 wherein an upper surface of each of the five vanes is dimpled to create a venturi effect.

14. The impeller of claim 10 wherein an upper surface of each of the five vanes has a PTFE surface treatment to prevent snow and ice from sticking to the vanes and to expedite removal of rain drops.

15. The impeller of claim 10 wherein the truncated conical body and the five vanes are constructed of carbon fiber.

16. A wind-powered electrical generation system comprising:
a truncated cone-shaped impeller oriented so that a rotational centerline of the impeller is oriented vertically, said impeller having a plurality of vanes extending outward from an outer surface of the impeller, each vane arranged in a spiral configuration around the impeller and completing between two and five circuits around the rotational centerline;
a transmission shaft fixed to the cone-shaped impeller, a centerline of the transmission shaft coincident with the rotational centerline of the impeller; and
an electrical generator coupled to the transmission shaft so that rotation of the cone-shaped impeller causes the electrical generator to generate electrical energy.

* * * * *